United States Patent [19]

Ozeki et al.

[11] 3,822,375

[45] July 2, 1974

[54] DATA PROCESSING SYSTEM

[75] Inventors: Masanori Ozeki; Masákata Sawada; Takeei Yamazaki, all of Tokyo, Japan

[73] Assignee: Nippon Kokuyu Tetsudo, Tokyo-To, Japan

[22] Filed: Aug. 29, 1972

[21] Appl. No.: 284,617

Related U.S. Application Data

[63] Continuation-in-part of Ser. No. 839,573, July 7, 1969, abandoned.

[30] Foreign Application Priority Data

July 8, 1968 Japan .............................. 43-47121

[52] U.S. Cl. .............. 235/61.9 R, 197/20, 164/115, 235/151.22, 235/61.7 B, 179/2 DP

[51] Int. Cl. .. G06k 3/02, G06k 19/06, G06f 15/04, B41j 5/36, H04m 11/06

[58] Field of Search ... 235/61.6 A, 61.6 R, 61.11 R, 235/61.7 B, 61.9 R, 151.22; 197/20; 340/172.5, 149 A; 179/2 DP; 164/115

[56] References Cited

UNITED STATES PATENTS

| | | | |
|---|---|---|---|
| 2,275,396 | 3/1942 | Johnson | 164/115 |
| 2,905,299 | 9/1959 | Hildebrandt | 197/20 |
| 3,025,941 | 3/1962 | Blodgett | 197/20 |
| 3,234,363 | 2/1966 | Garth | 235/151.22 |
| 3,375,500 | 3/1968 | Fowler | 340/172.5 |
| 3,652,795 | 3/1972 | Wolf | 179/2 DP |

*Primary Examiner*—Daryl W. Cook
*Assistant Examiner*—Robert M. Kilgore
*Attorney, Agent, or Firm*—Robert E. Burns; Emmanuel J. Lobato; Bruce L. Adams

[57] ABSTRACT

Disclosure is made in connection with a data processing system, in which a mark reading-and-recording device consisting of a mark reading means and a mark recording means both included in one casing, a data processing device preferably provided in a separate station and operatively connected with the mark reading-and-recording device, and a sheet having a mark recording area and a print recording area to be recorded are provided, said system being operated in a manner such that the mark recording area of the sheet is further recorded with received data from the data processing device or with additional information locally originated, the information thus recorded being thereafter read out by the mark reading means in the mark reading-and-recording device and sent out to the data processing device, and the results processed in the data processing device are sent back to the mark reading-and-recording device and recorded in the print recording area of the sheet by the mark recording means provided therein.

2 Claims, 12 Drawing Figures

FIG. 4A1
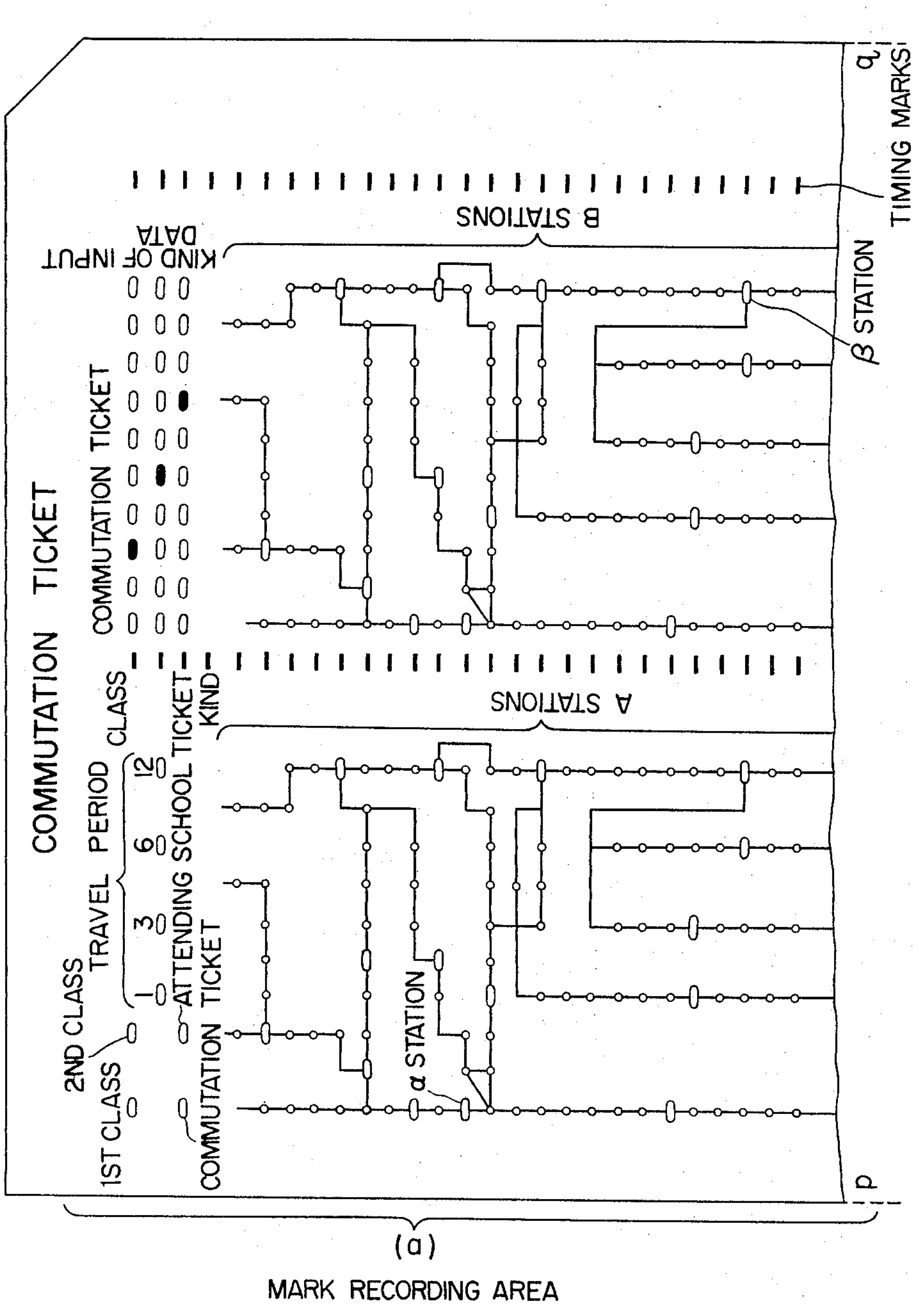

FIG. 4A2
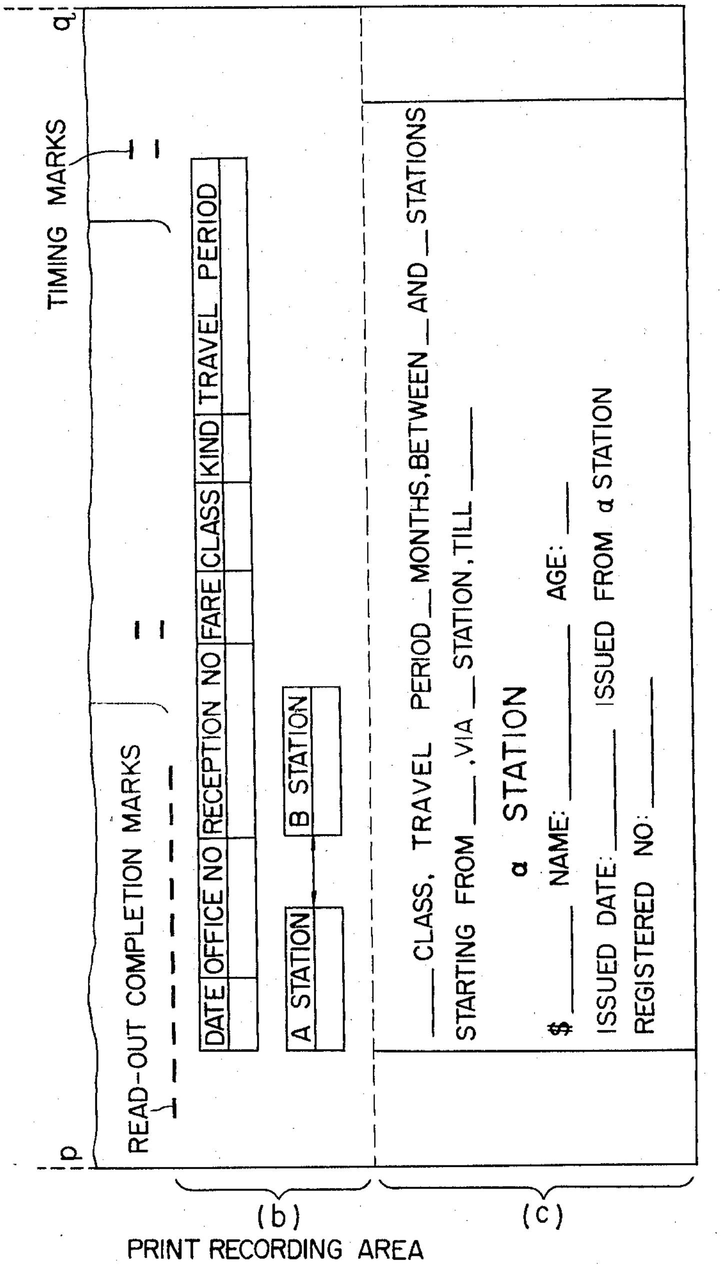

FIG. 4B1
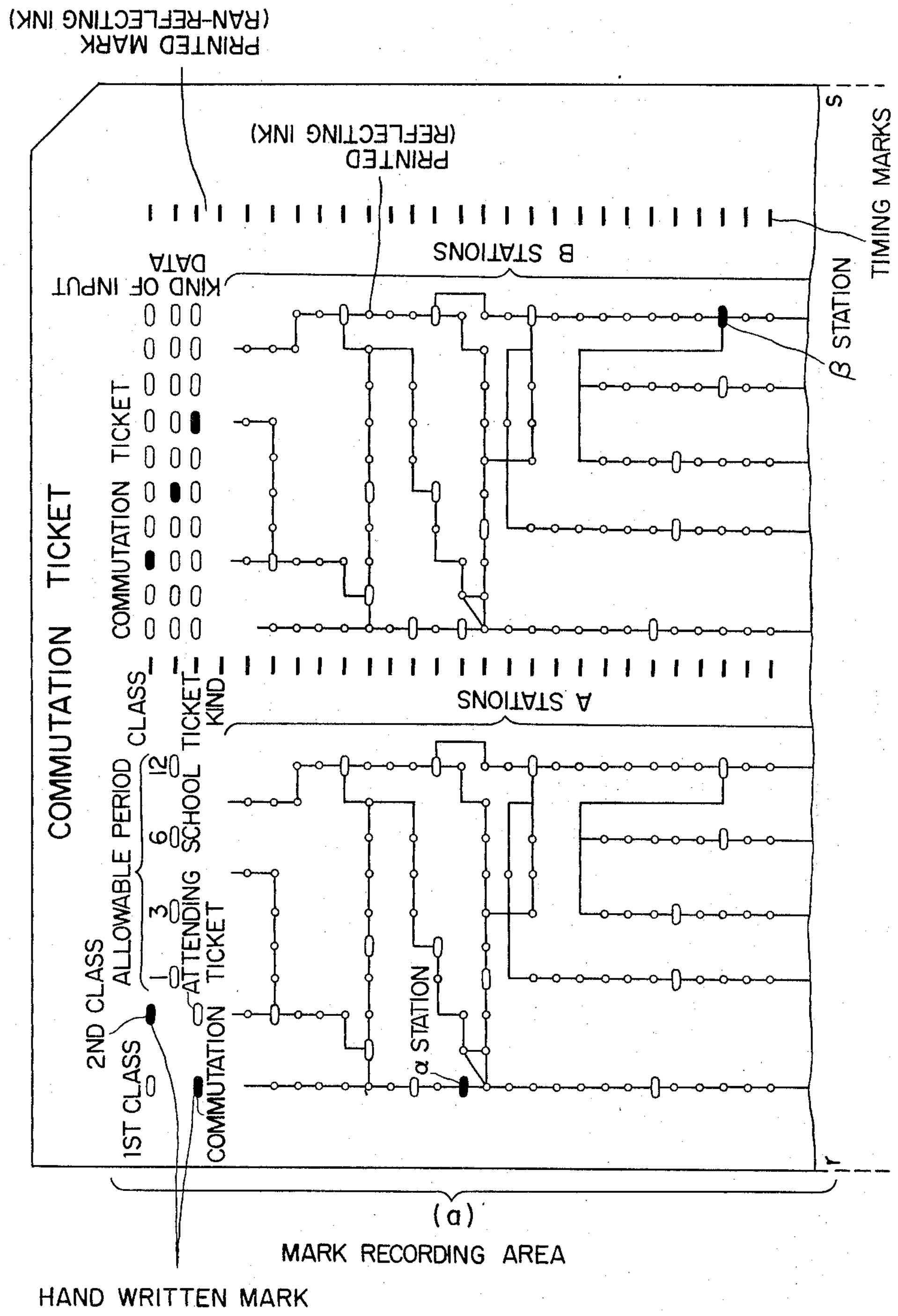

FIG. 4B₂
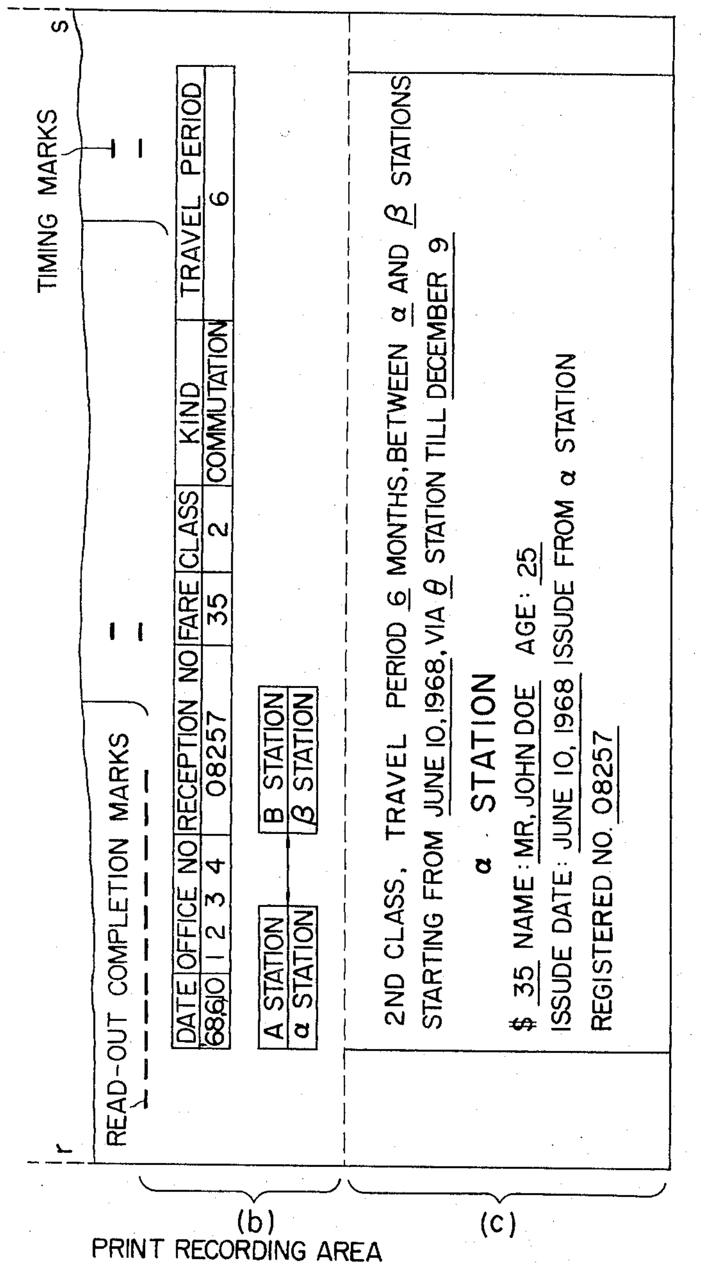

DATA PROCESSING SYSTEM

CROSS-REFERENCE TO RELATED APPLICATION

This application is a continuation-in-part of our copending application Ser. No. 839,573, filed July 7, 1969, entitied "DATA PROCESSING SYSTEM," now abandoned.

BACKGROUND OF THE INVENTION

The present invention relates to a data processing system and more particularly to a data processing system adapted for speedily preparing passenger tickets.

Along with the recent progress in electronic computers central data processing is a general tendency of the recent data processing practices. A typical method of the conventional data processing methods has comprised the steps of preparing a perforated tape having data based on data originated in a terminal station by employing for instance a perforation typewriter, reading out the tape mechanically or electrically, sending out the information thus read to a data processing device in a central station, processing the data in said date processing device, sending back the thus processed data to said terminal station, and recording therein the data thus received, for instance, by a perforation typewriter.

Otherwise, the operator in the terminal station transmits directly the data originated to the data processing device in the central station through a keyboard provided at the terminal station, and the processed data from the central station received in the terminal station are printed by a reception terminal device.

In either of these cases, however, it has been believed that the centralized processing of data cannot be carried out unless the data to be processed are converted into words, that is, coded into binary signals of several bits. Such a coding operation generally requires skilled personnel such as key punchers or teletype operators, and this fact not only has made it utterly impracticable for ordinary non-skilled persons to deliver the data originated into the data processing system but has also caused various inconveniences such as the probability for erroneous coding at the time when the data is coded by the operator, increasing of the frequency of occurrence of the data to be processed, or increasing of the quantity of the data originated, thus requiring excessive complication of the system, and requiring excessively long waiting time before the data are duly handled.

SUMMARY OF THE INVENTION

A primary object of the present invention is to provide a novel data processing system whereby the above described difficulties of the conventional data processing systems are completely eliminated.

Another object of this invention is to provide a novel data processing system wherein even ordinary non-skilled personnel can be allowed to handle the locally originated data to be associated with the data processing system.

Still another object of the invention is to provide a novel data processing system wherein the necessity of the troublesome coding of the data is completely eliminated.

Another object of the invention is to provide a novel data processing system wherein the locally originated data can be instantaneously incorporated with further processing and the results can be printed on the same sheet whereon the originated date have been marked.

A further object of the invention is to provide a data processing system whereby various kind of transportation tickets can be prepared with minimum waiting time.

These and other objects of the invention can be achieved satisfactorily by a novel data processing system comprising:

a mark reading-and-recording device which includes, in one casing thereof, a mark reading means and a mark recording means; a data processing device which is preferably provided in a separate station and operatively connected with the mark reading-and-recording device; and a sheet having at least one mark recording area to be read thereafter and at least one print recording area to be recorded; whereby information locally originated is filled therein in the form of marks, and information thus recorded is thereafter read out by the mark reading means in the mark reading-and-recording device and sent out to the data processing device, and the results processed in the data processing device are then sent back to the mark reading-and-recording device and recorded in the print recording area of the sheet by the mark recording means.

The nature, principle, and utility of the invention will be more readily apparent from the following detailed description with respect to preferred embodiments of the invention when read in conjunction with the accompanying drawings.

Figure 2:
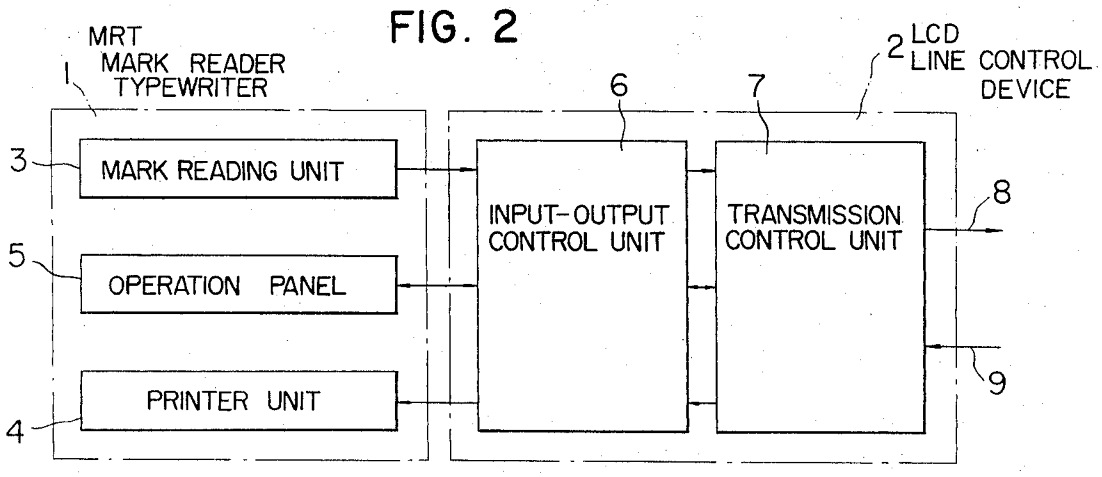
FIG. 2 is a block diagram of a terminal device employed in the present invention.
Figure 5:
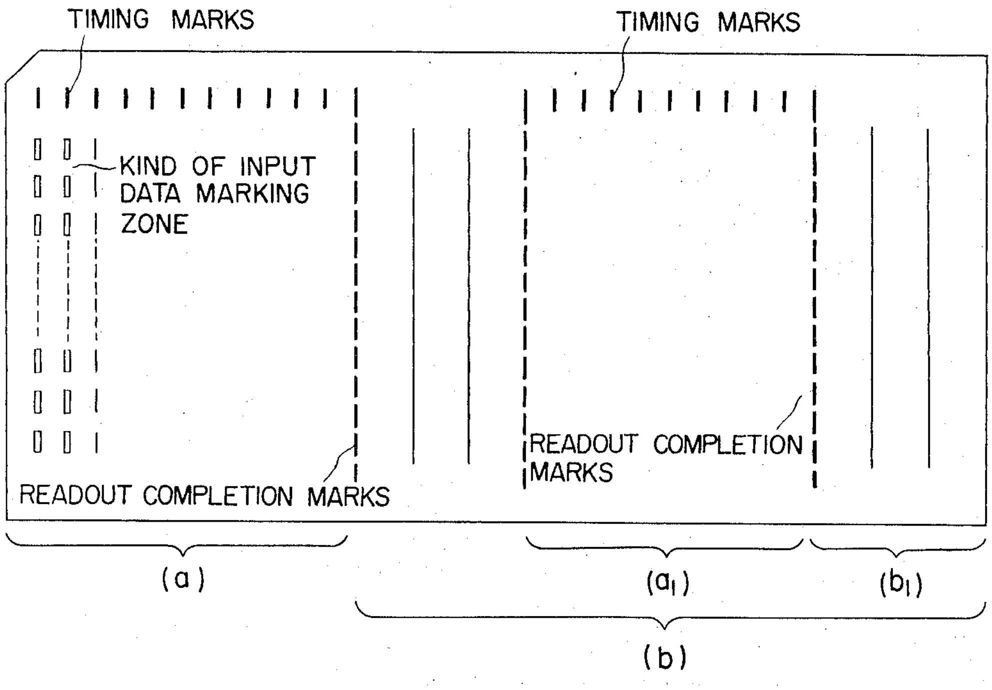
Figure 6:
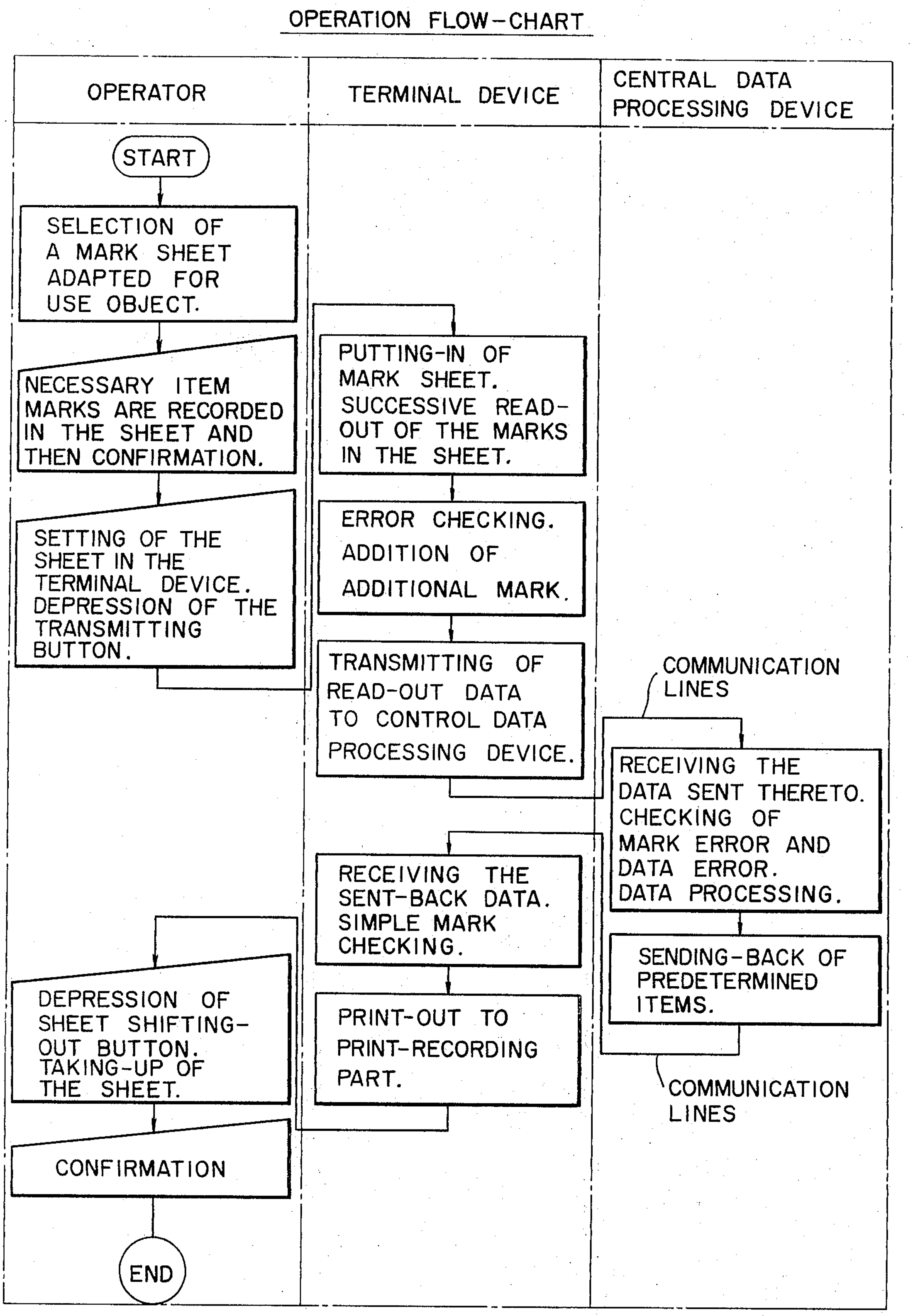
Figure 7:
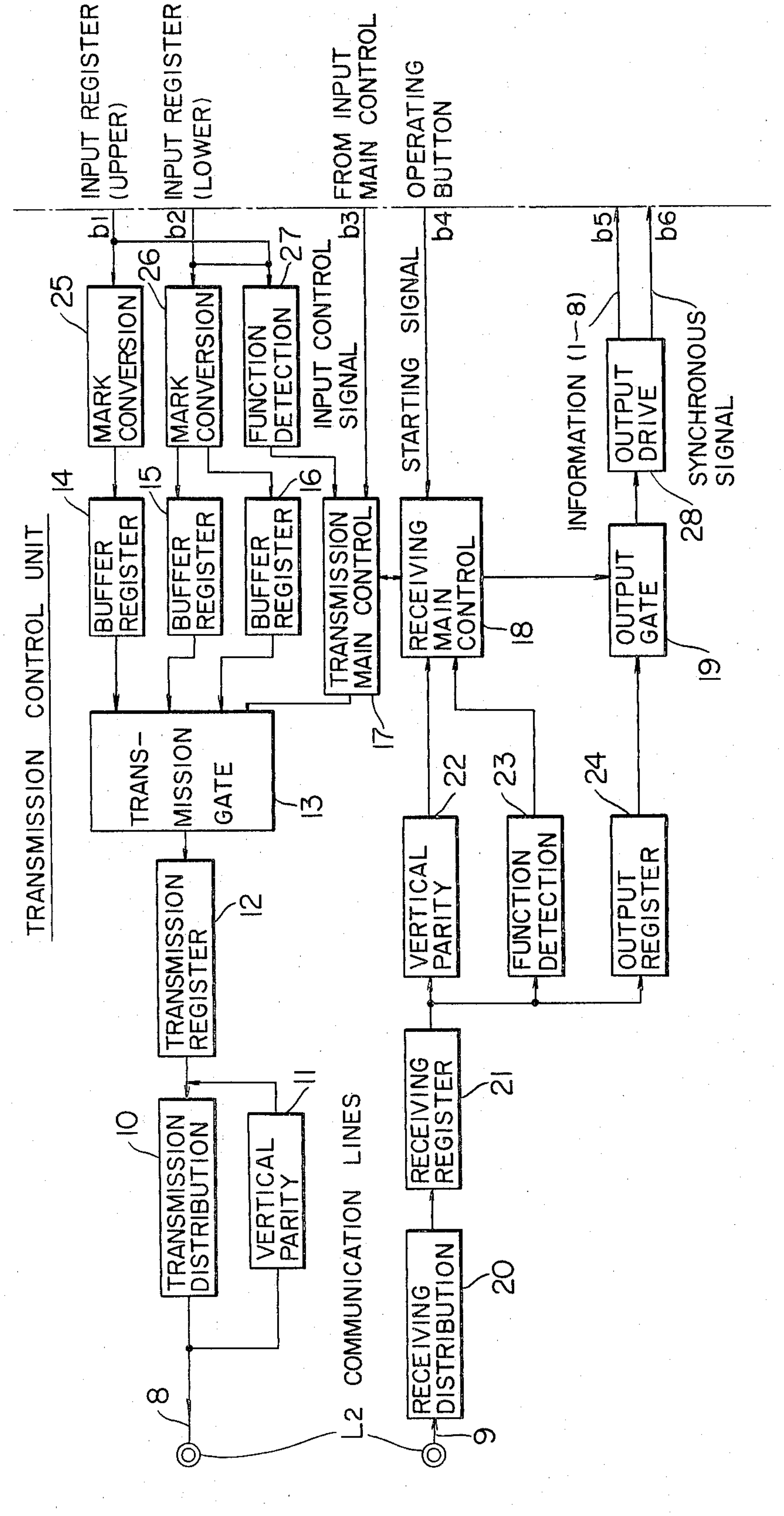
Figure 8:
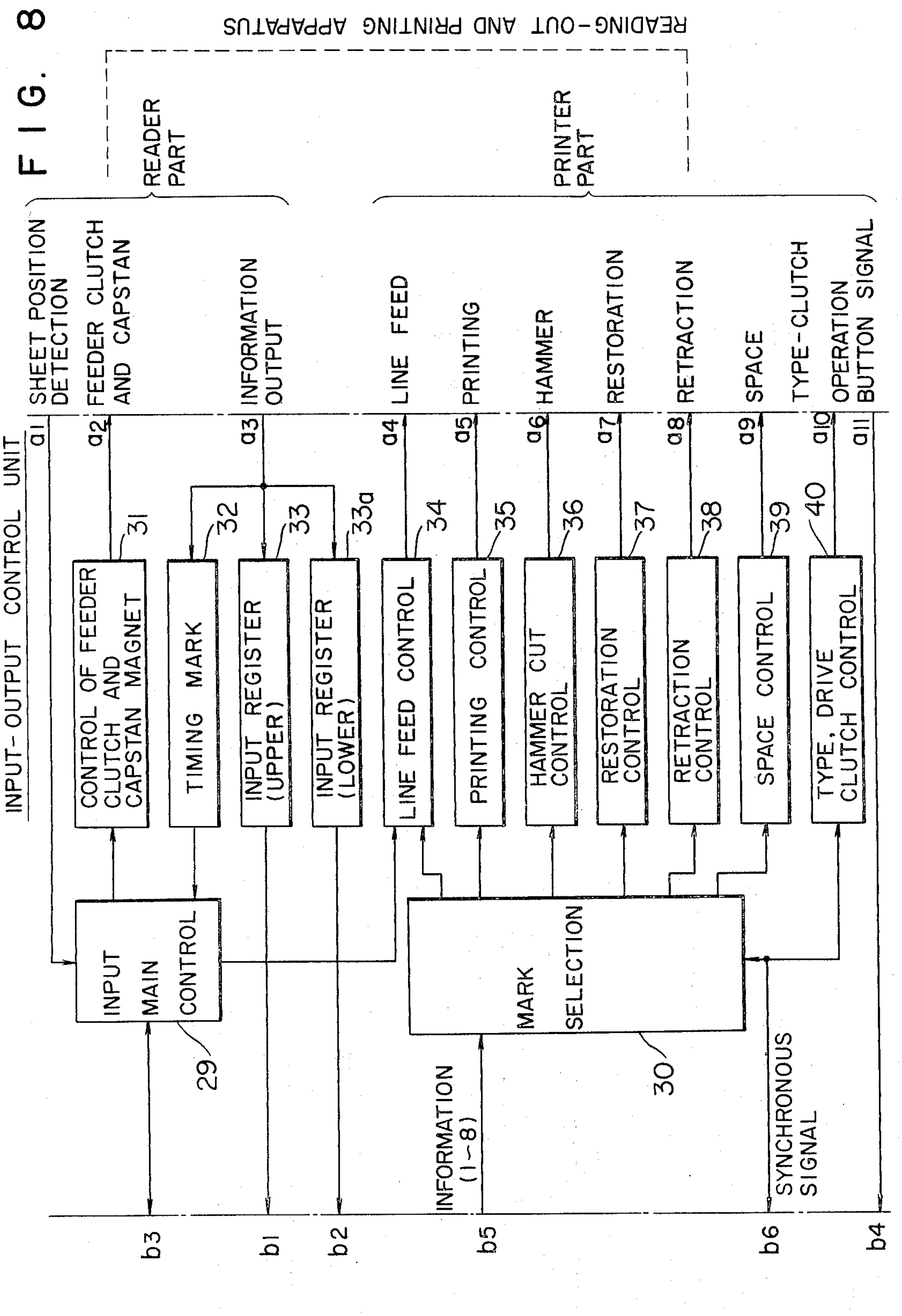
Figure 9:
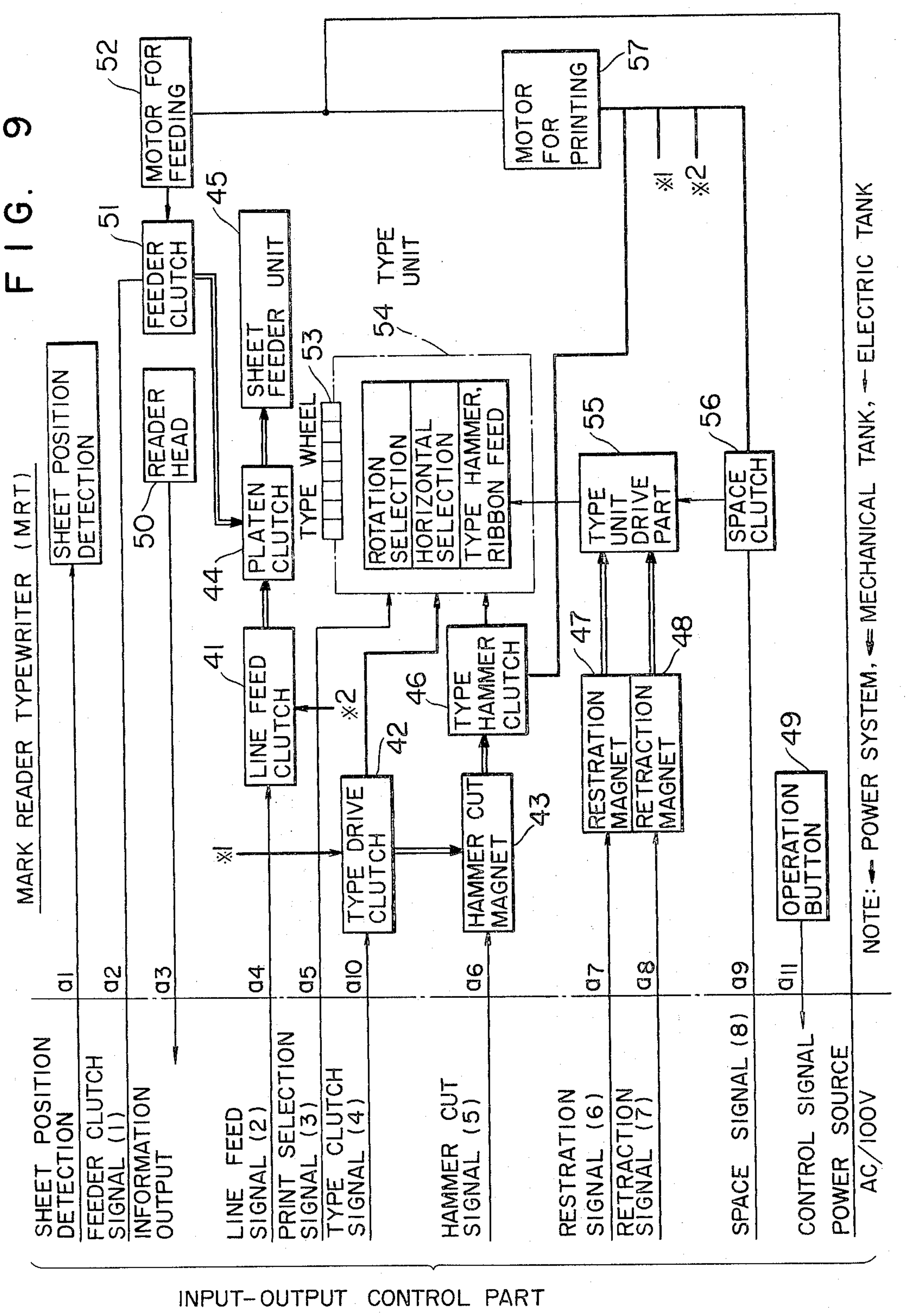

FIGS. $4A_1$, $4A_2$ and $4B_1$, $4B_2$ are the diagrams illustrating one example of the sheet employed in the present invention, wherein FIGS. $4A_1$, $4A_2$ show a sheet before being recorded, and FIGS. $4B_1$, $4B_2$ show the sheet after being recorded;

FIG. 5 is a schematic view of another example of a sheet wherein a plurality of mark recording areas and print recording areas are provided;

FIG. 6 shows an operation flow-chart of an embodiment according to the invention;

FIG. 7 is a block diagram of the transmission control unit illustrated in FIG. 2;

FIG. 8 is a block diagram showing the input-output control unit illustrated in FIG. 2; and FIG. 9 is a block diagram showing the mark reader typewriter (MRT) illustrated in FIG. 2.

In FIGS. 7, 8 and 9; $a_1$, $a_2$ - - - $a_{11}$, and $b_1$, $b_2$, - - - $b_6$ show the same points in connecting circuits, respectively.

DETAILED DESCRIPTION OF THE INVENTION

Figure 1:
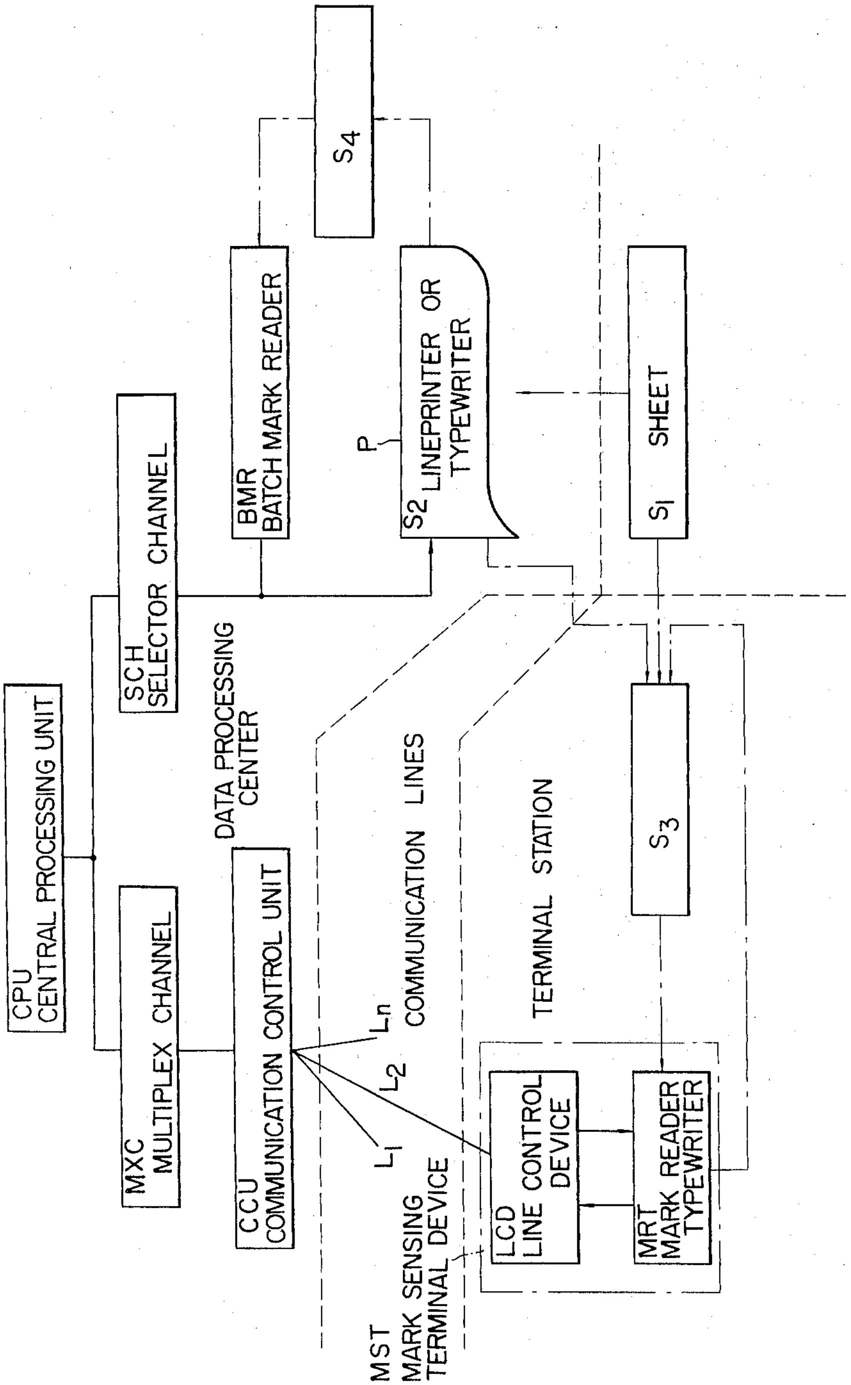
FIG. 1 is a block diagram of a data processing system according to the present invention.

Reference is made first to FIG. 1 which illustrates, in the form of a block diagram, an example of a data processing system according to the present invention, wherein a central processing unit CPU comprising a computer constituting the data processing device (not shown, because it is conventional one) is placed in a central station, and data from a terminal station is transmitted through communication lines $L_1$, $L_2$, - - - $L_n$ into said unit CPU.

As described summarily before, the data processing system according to this invention: comprises a mark reading-and-recording device (or mark sensing terminal device) MST including a mark reading unit and a mark recording unit both included in a casing, a data processing device which is in this example a central processing unit CPU provided in a central station; and a sheet S1 having a mark recording area and a print recording area to be recorded with required information-afterward. The mark sensing terminal device MST includes, in one casing, a line control device LCD and a mark reading-typewriter MRT comprising, in combination, a mark reading unit and a mark recording unit.

The sheet $S_1$ is printed beforehand in proper form through the use of, for instance, an ink of a reflecting nature and has an area (all of the marking positions are located at the intersecting points of the lines and the rows on the sheet) in which required data such as ticket kind, class, route, starting and termination stations, etc., are to be marked afterward by means, for instance, of a pencil, and another area which is to be printed afterward with the data processed in the data processing device. The sheet $S_1$ may also be printed beforehand with "Kind of Input Data" mark indicating the kind of sheet and process, a timing mark, readout-completion mark, or the like by employing a nonreflecting ink.

The sheet $S_1$ is then marked with data locally originated in the terminal station by hand writing and converted to a sheet $S_3$. When it is desired that the sheet $S_1$ be provided with further marking positions such as for the forwarding address, names of the articles to be transported, etc., the required markings may be printed on the sheet $S_1$ by employing a lineprinter or a typewriter P in order that said markings are read out and processed afterward in the central processing unit CPU, and the thus printed sheet is designated by $S_2$. The sheet $S_2$ is thereafter hand-marked with the required data and furnished to the mark reading-and-recording device MST. The sheet thus hand-marked is designated by $S_3$ as described above.

At the mark sensing terminal device MST, the data thus hand-marked on the sheet $S_3$ are read out by the reading unit in the mark reader typewriter MRT and sent out to the central station through the line control device LCD, a communication lines $L_1$, $L_2$ - - - $L_n$, a communication control unit CCU, and a multiplex channel MXC as described thereinafter.

At the central station, the data sent through the communication lines, the communication control unit CCU and the multiplex channel MXC are received and processed in the central processing unit CPU. The data thus processed or any other data desired to be sent to the terminal station are sent out from the central processing unit CPU through the multiplex channel MXC, communication control unit CCU, and the communication lines $L_1$, $L_2$ - - - $L_n$.

At the terminal station, the data sent back from the unit CPU, are received in the mark sensing terminal device MST through the MXC, OCU and communication lines, and the thus received data is further printed by the printer unit of the mark reader typewriter MRT in the print recording area of the sheet $S_3$.

Furthermore, in the case where the thus printed sheet is required to be further processed depending on the nature of the data, the sheet may be provided beforehand with a plurality of the mark recording areas to be hand-written and a plurality of print recording areas to be recorded thereafter, and in this case first print recording may be not only character informations for operation but also marks needed for the next procession in the date processing device.

At the time when the reception and printing of the data are carried out in the terminal station, the following three methods may be considered.

1. Marks on the sheet are read out, sent to the central station and processed therein, sent back to the terminal station, and the processed results are printed on the same sheet from which the marks are read out.

2. Data from the central station are received at a terminal station and printed on a sheet, the operator in the terminal station, while seeing the data thus printed on the sheet, writes further marks on the same sheet and send back the thus written marks to the central station. This is a so-called turn around processing system.

3. The method described in (2) above is repeated twice, and all of the marks and data are printed on the same sheet.

Other than the above described methods, there may also be considered a variation such as that the above described hand written markings are replaced by those printed on the sheet by means of a line-printer or a special typewriter, thus converting the sheet $S_1$ into $S_2$ on which required data are further marked, and the thus obtained sheet is thereafter read out in the terminal device MST and sent to the central processing station.

The data processing system as illustrated in FIG. 1 may be utilized to accomplish another function by utilizing a part of the system. More specifically, the sheet $S_2$, which is converted from the sheet $S_1$ by printing required marks on the sheet $S_1$ by employing a line-printer or a special typewriter, is further supplemented by marks, if said marks are required, by a hand marking procedure and converted into sheet $S_4$. The sheet $S_4$ thus obtained is thereafter read out by means of a batch mark reader BMR the read information of which is sent to the computer of the central processing unit CPU through a selector channel SCH. The data processed in the unit CPU is sent back and printed on the sheet $S_4$ by the line-printer or typewriter P, and the sheet thus obtained may be employed instead of the above described sheet $S_2$ for further treatment in the mark sensing terminal device MST.

FIG. 2 illustrates, in the form of a block diagram, the mark sensing terminal device MST. As is apparent from the figure, the mark reader typewriter MRT designated by numeral 1 comprises a mark reading unit 3, a printer unit 4 (mark recording unit) and an operation panel 5.

The line control device LCD designated by numeral 2 in FIG. 2 comprises an input-output control unit 6 for controlling the mark reader typewriter 1, and a transmission control unit 7 which carries out various functions of conversion of the marked data read out by the mark reading unit 3 in the mark reader typewriter MRT into coded data and delivery of said converted data into the communication lines, receiving of the coded data and decoding thereof for further printing in the mark recording means, error checking, and functional detection and control.

Figure 3:
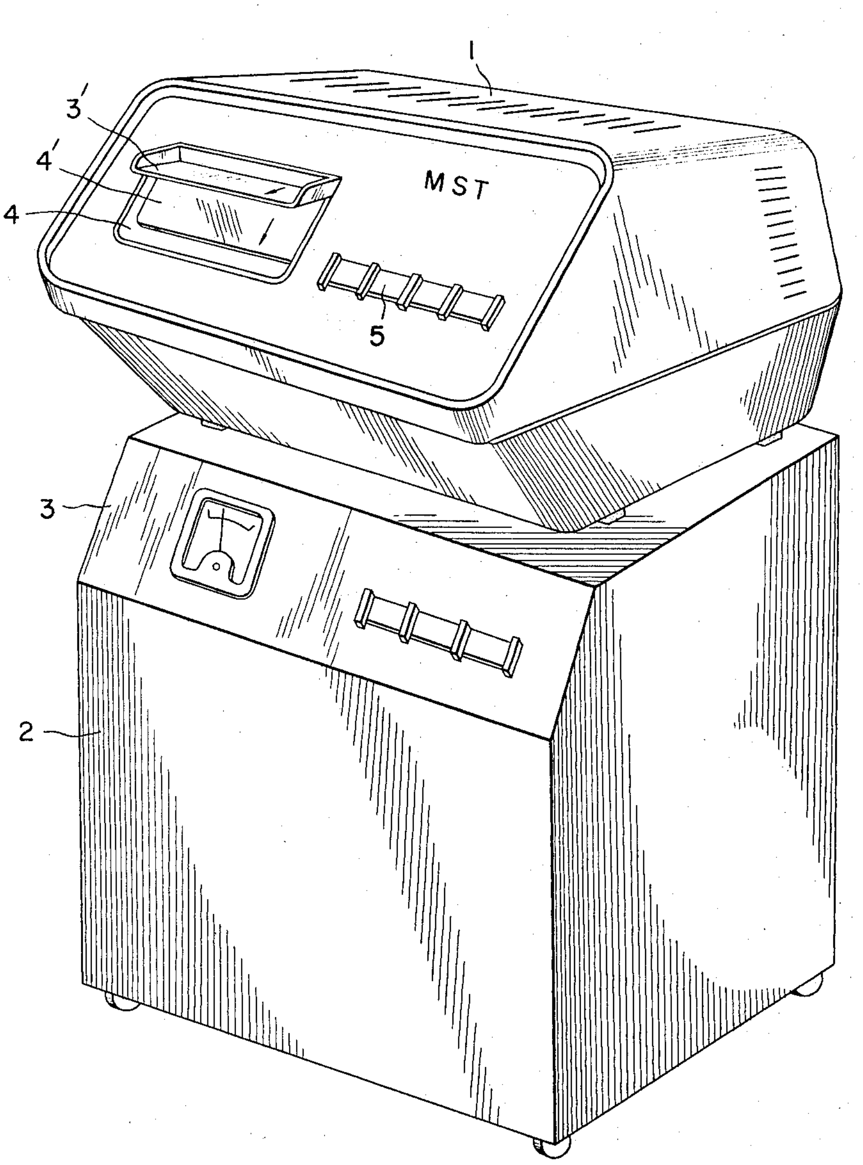
FIG. 3 is a perspective view of the terminal device.

FIG. 3 illustrates a structural outside view of the mark sensing terminal device MST. The device MST comprises the mark reader typewriter 1 and the line control device 2. The mark reader typewriter 1 comprises an operation panel 5 including pushbuttons such as transmitting, receiving and retransmitting buttons and an outlet button, a printer unit 4, a mark reading unit 3, a sheet inlet port 3', and a sheet outlet port 4'.

The operation of the device MST will now be described. When a sheet $S_3$ which has been marked with required information, for instance, by pencil, is furnished to the inlet port 3' of the mark reading unit 3 and a pushbutton is depressed, the sheet $S_3$ is shifted to a position wherein the information written by pencil is read out by the mark reading unit 3 and sent out to the input-output control unit 6. The information is thereafter sent to the transmission control unit 7 and transformed into coded information. The coded information is thereafter sent out from the transmission control unit 7 through a communication line 8 to the central processing unit CPU at the central station.

At the central station, the received data is processed in accordance with a predetermined manner, and the results are sent back to the mark sensing terminal device MST.

At the terminal station, the information sent out from the data processing unit CPU is received by the transmission control unit 7 through a communication line 9, and after the validity is checked, the information is sent to the input-output control unit 6. At the input-output control unit 6, the code selecting circuit judges whether the information received is intended for the functional control of the printer unit 4 or for the printing control of the same unit 4, and if it is judged to be the latter, a print selecting operation, a print hammering operation, and a spacing operation are controlled by the input-output control means 6. If it is judged to be the former, on the contrary, a hammer out control, a spacing cut control, etc., are thereby achieved. In this way, the information received at the terminal station is printed in the recording area of the same sheet from which the information was read out and sent to the central station. The sheet is then delivered from the outlet port 4' of the mark sensing terminal device MST.

Although it has been indicated above that the data processing device is located in a central station, the data processing device may also be partly provided in the local terminal station or in the mark sensing terminal device MST itself, and the sheet may be processed totally or partly by such a part of the data processing device when the sheet is merely furnished into the inlet port 3' and the various pushbuttons provided on the operation panel 5 are depressed.

FIG. 4 shows one example of the sheet employed in the present invention and is in the form of an application sheet for a commutation ticket. In such a sheet, there are provided a mark recording area (a) printed with a reflecting ink and including various positions wherein the kind of ticket, class, travel period, name of stations, etc., required for a ticket are to be filled with works; and another print recording area (b) wherein the resultant processed data are to be printed.

In addition to the above described printed marks such as "Kind of Input Data," timing marks which can be read out repeatedly at a predetermined time interval may be printed at the right portion of the mark recording area (a), and a read-out completion marks may be printed at the upper portion of the print recording area while employing non-reflecting ink in both cases. The sheet of this condition has been designated by $S_1$ in the above description.

The sheet $S_1$ is then marked in the desired positions provided in the mark recording area (a) in accordance with any locally originated data by employing, for instance, a pencil, whereby the sheet $S_1$ is transformed into a sheet $S_3$ which is shown in FIG. 4(B).

The sheet $S_3$ is then furnished into the mark sensing terminal device MST, and the marked data are read out by the mark reading unit 3 and sent out to a central station through the communication lines. At the central station, the data is processed in the data processing device and sent back to the terminal station as described before. The data thus processed are then automatically printed in the area (b) on the same sheet from which the data has been read out as described above. The sheet thus printed with the processed data as shown in FIG. 4(B) may be filed as a file copy which is kept in the terminal station for future reference.

In all of the above described cases, it would be convenient if the distances or spaces between each of the marks were determined to conform with the distances or spaces obtained between the printed letters by the line printer or typewriter or with an integer multiple of the distance or spaces, because hand written markings are replaced by the line printer or printer unit of the mark reader typewriter.

The operation of the data processing system according to the present invention will now be described with respect to an example wherein commutation ticket application sheets, as described, are employed.

When a passenger desired to obtain a commutation ticket, the ticket office man at first takes a sheet as shown in FIG. 4(A), and puts marks heard from the passenger in the required positions by means of, for instance, a pencil. For example, the positions for the kind, class, travel period, home and workplace stations such as A and B, "second class," "6 months," "Alpha station," and "Beta station" are marked, respectively, and the sheet thus marked is thereafter furnished to the mark reading unit 3 of the mark reader typewriter MRT shown in FIG. 2. The data read by the mark reading unit 3 is then sent to the data processing device in the central station.

In the data processing device, the kind of the data sent from the terminal station is first detected from the marked position corresponding to the "kind of input data" marking position on the sheet and the necessary programs are prepared automatically. Other marking positions are then read out, the data thus read being processed in the data processing device, and the resultant data are thereafter sent back to the terminal station. The printer unit 4 in the mark reader typewriter MRT prints the data thus received on the required positions in the sheet from which the data was initially read out by the mark reading unit 3 of the same mark reader typewriter MRT.

It should be noted that the above described mark reading unit 3 and the printer unit 4 are included in the same casing, and that after the mark recording area (a) in the sheet has been read out by the mark reading unit 3, the sheet is automatically shifted so that the print recording area (b) of the sheet aligns with the printer unit 4.

From the data processing device in the central station, the processed data such as the receiving date "6-10-68" set in the processing device on that day; the identification number of the received office such as "1234"; the reception number at the data processing device such as "08257"; transportation fee counted in the data processing device on the basis of the home station and the workplace station marked on the sheet, for instance, "$35", and those marked on the sheet and transmitted from the terminal station such as "second class," "commutation ticket," "travel period," "home and workplace stations A and B" such as "Alpha" and "Beta" are all transformed into characters and sent back to the terminal station and recorded in the area (b) of the same sheet from which the data has been read out by the reading unit 3.

At the terminal station, the data thus recorded in the area (b) are confirmed but require no calculation, and the necessary items among the recorded data are copied on the commutation ticket area (c) by hand writing. At this time, other data such as desired starting date of the travel period of the ticket route, and name of the passenger are also heard from the passenger and hand written in the area (c). The sheet is then cut along the broken line, and the commutation ticket area (c) is then handed to the procuring passenger.

In this case, if the positions in the area (a) are increased so that the data concerning the "route," "starting date of the period," "name of the passenger" of the like may be marked therein, the area(c) as well as the area (b) may be printed automatically, and the requirement of the above described hand writing is thereby eliminated.

The above-mentioned operation can be summarized as shown in FIG. 6, in which the left, middle and right columns correspond respectively to operation by an operator, the operation at the terminal device, and operation at central data processing device, and in which the various arrows show successive order of the operations.

Referring to FIG. 6: in the starting of the apparatus, an operator carries out selection of a mark sheet adapted for use object, and then the necessary item marks are recorded in the sheet selected as mentioned above and the thus recorded marks are confirmed by the operator. This recorded and confirmed sheet is set in the terminal device, and then the transmitting button depressed.

In the terminal device: upon putting-in of the mark sheet, successive read-out of the marks contained in the mark sheet is automatically carried out. Then, error checking and addition of additional marks are carried out. Upon error checking and completion of addition of additional marks, the read-out data is transmitted to the control data processing device through the communication lines.

In the control data processing device: the data sent thereto from the terminal device is received and the thus received data is subjected to checking of the mark error and data error and then to data processing. Among the thus processed data, only data corresponding to the predetermined items are sent back to the terminal device through the communication lines.

In the terminal device, the sent-back data is received and simple mark checking is done, and then the marks are printed in the print-recording part.

Then, the sheet shifting-out button is depressed and the thus shifted-out sheet is taken out by the operator, and this taken-out sheet is confirmed.

After completion of the above-mentioned operations, one cycle of the ticket preparation is completed.

Referring now to FIG. 2, as the transmission control unit, input-output control unit, and mark reader typewriter, are circuits illustrated respectively in FIGS. 7, 8 and 9 by block diagrams can be used for example. In the circuit shown in FIG. 7;

10 — Transmission distribution part,
11 — Vertical parity part,
12 — Transmission register part,
13 — Transmission gate part,
14, 15 and 16 — Buffer register parts,
17 — Transmission main control,
18 — Receiving main control,
19 — Output gate,
20 — Receiving distribution part,
21 — Receiving register part,
22 — Vertical parity part,
23 — Function detection part,
24 — Output register part,
25 — Mark conversion part,
26 — Mark conversion part,
27 — Function detection part, and
28 — Output drive part.

In the circuit shown in FIG. 8;

29 — Input main control part,
30 — Mark selection part,
31 — Control part of feeder clutch and capstan magnet,
32 — Timing mark,
33 and 33*a* — Input resisters (upper and lower) parts,
34 — Line feed control part,
35 — Printing control part,
36 — Hammer cut control part,
37 — Restoration control part,
38 — Retraction control part,
39 — Space control part, and
40 — Type, drive clutch control part.

In the circuit shown in FIG. 9;

41 — Line feed clutch part,
42 — Type drive clutch part,
43 — Hammer magnet part,
44 — Platen clutch part,
45 — Sheet feeder unit,
46 — Type hammer clutch,
47; 48 — Retraction and Retraction magnets respectively,
49 — Operation button part,
50 — Reader head part,
51 — Feeder clutch part,
52 — Motor for feeding,
53 — Type wheel part,
54 — Type unit including rotation selection part, horizontal selection part, and type hammer and ribbon feed part, respectively,
55 — Type unit drive part,
56 — Space clutch part, and
57 — Motor for printing.

FIG. 5 indicates another example of the sheet employable in the turn-around system as described before. In such a case, the locally originated data are marked in the mark recording area (a), the data thus marked being read out thereafter and transmitted to the central station, and the processed data therein are then sent back to the terminal station and recorded in the print recording area (b) of the same sheet. The print recording area includes a mark recording area ($a_1$) and a print recording area ($b_1$) which are necessary for the next operation. The mark information in the informations sent from the above-mentioned central processing device can be recorded in the mark recording area ($a_1$).

In the mark sheet mark recording area ($a_1$) of which has been recorded, further necessary marks corresponding to additional data, that is, marks indicating the second input are marked at a predetermined zone (for instance, kind of input data zone) of the area (a) and also marks corresponding to informations to be newly and additionally inserted are marked in the area ($a_1$), and then the thus marked sheet is again inserted into the mark sensing terminal device MST, whereby the second processing is carried out. When the secondly marked area ($a_1$) is registered with the mark reading unit 3, the read-out operation of the unit 3 is initiated, and the results are sent out to the data processing device. The data processed in the data processing device are thereafter sent back to the terminal station and recorded in another print recording area ($b_1$).

According to the method as mentioned above, the same processing can be repeatedly carried out for many times in accordance with sheet design and program. This is so-called as "turn-around."

As described above in detail, the data processing system according to the present invention is so composed that a sheet having a mark-recording area and a print-recording area is employed, any locally originated data is mark-recorded in the mark-recording area on the sheet, the data thus recorded is read out and sent to a data processing device, and the data processed in the data processing device is received and print-recorded in the print-recording area on the sheet, whereby the operation of the data processing system by non-skilled personnel is made possible. With the system according to this invention, the data can be treated at any time by marking in the mark-recording area and sending it to the data processing device, and, even in the case of the turn-around processing system, the sheet can be treated in an approximately similar manner.

Moreover, since the read-out data and processed data are recorded on one sheet, confirmation of the contents and answering to any inquiry can be easily accomplished. Furthermore the mark reading unit and the mark recording unit are encased in the same enclosure of the terminal device MST, another advantageous feature of automatized feed-in and feed-out operation of the sheet can be thereby obtained, and the confirmation of the operation can be easily carried out.

We claim:

1. A data processing system comprising, in combination: a mark sheet having an information area for making marks thereon having information content to be read out wherein said marks are all of a single style character and said information content to be read out is derived from the position of the marks on the mark sheet, and an information receiving area, a mark sensing terminal device comprising a mark reading unit for reading out marks on said information area having marks with positions corresponding to given data and recorded therein, a mark printer unit for printing on said information receiving area of said sheet, and mechanism for shifting said sheet within said device whereby marks read out and data recorded on said information receiving area are not again read out and recorded thereon; a central data processing unit connected to receive the read-outs of said mark reading unit and having means to process said read-outs and means to transmit said processed data in conjunction with confirmation data back to said mark sensing terminal device; a line control device provided in said mark sensing terminal device and comprising an input-output control unit receptive of readouts of said mark reading unit, a transmission control unit transmitting said readouts to said central data processing device, communication lines to transmit the readout from said transmission control unit to said central data processing device, communication lines for transmitting back said processed data from said central data processing device to said transmission control unit and mark printer unit through said transmission control unit and said input-output control unit thereby to print said processed data on the information receiving area of said sheet, said mark printer unit and said mark reading unit comprising a mark reader typewriter.

2. A data processing system comprising, in combination; a mark sheet having together at least one mark recording area for making marks thereon having information content to be read out wherein said marks are all a single style character and said information content to be read out is derived from the positions of the marks on the mark sheet, and at least one print recording area, mark pitch and line pitch of said mark sheet being made to be integral multiple of the printing pitch and line pitch of the typewriter, and said sheet being adapted to be recorded with line printer connected to central processing unit or mark sensing terminal device described later;

a central data processing unit provided with an input side for receiving data sent thereto and an output side for sending out the data processed therein, said unit being adapted to process the mark position informations received thereby in accordance with a previously prepared program thereby to prepare response information;

a mark sensing terminal device adapted to transmit the recorded marks to said central data processing unit, and further adapted to receive the data processed in and sent back from said central data processing unit and to print the thus received data consisting of character form for operator and sometimes mark form for next operation on said print recording area of said mark sheet;

a mark read-out unit provided with a read-out head capable of reading out the marks recorded and written by hand on said mark sheet, and a mark printer unit adapted to print any character or mark on the print recording area of said mark sheet, said mark read-out unit and mark printer unit being provided in a casing of the mark sensing terminal device;

a mark sheet shifting means adapted to shift the said mark sheet to the position where printing by said mark printer unit is desired; and input-output control unit, transmission control unit, and communication lines which are adapted to cause transmission of the information read-out by said mark read-out unit to the central data processing device, receiving of the data processes in the central data processing unit by the mark sensing terminal device, and operation of said mark printer unit.

* * * * *